United States Patent
Yamashita et al.

(10) Patent No.: US 12,117,600 B2
(45) Date of Patent: Oct. 15, 2024

(54) CONFOCAL MICROSCOPE UNIT AND CONFOCAL MICROSCOPE

(71) Applicant: HAMAMATSU PHOTONICS K.K., Hamamatsu (JP)

(72) Inventors: Jiro Yamashita, Hamamatsu (JP); Yasuyuki Tanabe, Hamamatsu (JP); Shunsuke Matsuda, Hamamatsu (JP); Hirotoshi Terada, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 423 days.

(21) Appl. No.: 17/442,238

(22) PCT Filed: Mar. 26, 2020

(86) PCT No.: PCT/JP2020/013799
§ 371 (c)(1),
(2) Date: Sep. 23, 2021

(87) PCT Pub. No.: WO2020/196783
PCT Pub. Date: Oct. 1, 2020

(65) Prior Publication Data
US 2022/0155577 A1    May 19, 2022

(30) Foreign Application Priority Data

Mar. 28, 2019   (JP) ................. 2019-062976

(51) Int. Cl.
*G02B 21/16*      (2006.01)
*G01N 21/64*      (2006.01)
(Continued)

(52) U.S. Cl.
CPC ..... *G02B 21/0048* (2013.01); *G01N 21/6458* (2013.01); *G02B 21/0032* (2013.01);
(Continued)

(58) Field of Classification Search
CPC .... G02B 21/16; G02B 21/00; G02B 21/0048; G02B 21/6458; G02B 21/0032;
(Continued)

(56) References Cited

U.S. PATENT DOCUMENTS

| 8,643,947 B2 | 2/2014 | Nezu et al. |
| 2004/0150880 A1 | 8/2004 | Nakata et al. |

(Continued)

FOREIGN PATENT DOCUMENTS

| CN | 1886689 A | 12/2006 |
| CN | 106980174 A | 7/2017 |

(Continued)

OTHER PUBLICATIONS

International Preliminary Report on Patentability mailed Oct. 7, 2021 for PCT/JP2020/013799.
(Continued)

*Primary Examiner* — Jurie Yun
(74) *Attorney, Agent, or Firm* — Faegre Drinker Biddle & Reath LLP

(57) ABSTRACT

A confocal microscope unit according to an embodiment includes: a first subunit which includes a light source, a pinhole plate, and a photodetector; a second subunit which includes a light source, a pinhole plate, and a photodetector; a scan mirror which scans excitation light on a sample and guides fluorescence generated from the sample to the first and second subunits; a scan lens which guides the excitation light and guides the fluorescence to the scan mirror; and a main housing which is attachable to a connection port and to which the scan mirror, the scan lens, and the subunits are fixed, wherein the first subunit includes a dichroic mirror that separates the excitation light and fluorescence handled by the own unit from those handled by the second subunit.

8 Claims, 4 Drawing Sheets

(51) Int. Cl.
*G02B 21/00* (2006.01)
*G02B 26/08* (2006.01)
*G02B 27/14* (2006.01)

(52) U.S. Cl.
CPC ......... *G02B 21/0076* (2013.01); *G02B 21/16* (2013.01); *G02B 26/0833* (2013.01); *G02B 27/14* (2013.01)

(58) Field of Classification Search
CPC ........... G02B 21/0064; G02B 21/0076; G02B 26/08; G02B 26/0833; G02B 27/14; G02B 27/145; G01N 21/64; G01N 21/6458; G01N 2021/6417
See application file for complete search history.

(56) References Cited

U.S. PATENT DOCUMENTS

| | | |
|---|---|---|
| 2011/0119034 A1 | 5/2011 | Liedtke et al. |
| 2013/0015370 A1 | 1/2013 | Damaskinos et al. |
| 2013/0193345 A1 | 8/2013 | Nishiwaki |
| 2015/0323775 A1 | 11/2015 | Suzuki |

FOREIGN PATENT DOCUMENTS

| | | |
|---|---|---|
| EP | 2317363 A2 | 5/2011 |
| EP | 2322969 A1 | 5/2011 |
| JP | H06-167654 A | 6/1994 |
| JP | H10-206742 A | 8/1998 |
| JP | 2003-185927 A | 7/2003 |
| JP | 2006-064384 A | 3/2006 |
| JP | 2006-133499 A | 5/2006 |
| JP | 2008-203417 A | 9/2008 |
| JP | 2009-104136 A | 5/2009 |
| JP | 2009-116082 A | 5/2009 |
| JP | 2009-198980 A | 9/2009 |
| JP | 2011-090248 A | 5/2011 |
| JP | 2013-225061 A | 10/2013 |
| JP | 2017-535816 A | 11/2017 |
| WO | WO-2016/075195 A1 | 5/2016 |
| WO | WO-2017/145230 A1 | 8/2017 |

OTHER PUBLICATIONS

International Preliminary Report on Patentability mailed Oct. 7, 2021 for PCT/JP2020/013801.

CONFOCAL MICROSCOPE UNIT AND CONFOCAL MICROSCOPE

TECHNICAL FIELD

The present disclosure relates to a confocal microscope unit constituting a confocal microscope and a confocal microscope.

BACKGROUND ART

Conventionally, a confocal microscope capable of obtaining an optical sectioning image of a specimen to be observed with high resolution has been known. For example, Patent Literature 1 below discloses a microscope connection unit including a microscope connection port which is connected to a microscope, a stimulation unit which irradiates a specimen with light, an observation unit which detects light emitted from the specimen, and an optical path synthesizer which synthesizes optical paths optically connecting the microscope to the stimulation unit and the observation unit. In this microscope connection unit, the same observation unit is provided with an optical system which guides light emitted from a plurality of light sources and a dichroic mirror, a confocal pinhole, and a photomultiplier tube which detect fluorescence generated in response to the light for each of a plurality of wavelengths. In such a configuration, imaging in a plurality of wavelength regions is realized with the same device by using excitation light of a plurality of wavelengths and detecting fluorescence generated in response to the excitation light.

CITATION LIST

Patent Literature

Patent Literature 1: Japanese Unexamined Patent Publication No. 2011-90248

SUMMARY OF INVENTION

Technical Problem

In the above-described conventional unit, when constructing a confocal optical system, it has been necessary to provide a light source outputting excitation light or an aperture limiting a luminous flux of fluorescence at a conjugate position with respect to the dichroic mirror separating the excitation light and the fluorescence and it has taken effort to optically adjust this conjugate position.

Embodiments have been made in view of such problems and an object is to provide a confocal microscope unit capable of easily performing confocal imaging at a plurality of wavelengths by providing a unit in which a light source outputting excitation light and an aperture limiting a luminous flux of fluorescence are provided at a conjugate position with respect to a dichroic mirror.

Solution to Problem

A confocal microscope unit according to an embodiment of the present disclosure is a confocal microscope unit attached to a connection port of a microscope including a microscope optical system to constitute a confocal microscope, the confocal microscope unit including: a first subunit which includes a light source configured to output first excitation light, a first aperture configured to limit a luminous flux of first fluorescence generated from a sample to be observed in response to the first excitation light, and a first photodetector configured to detect the first fluorescence having passed through the first aperture; a second subunit which includes a light source configured to output second excitation light, a second aperture configured to limit a luminous flux of second fluorescence generated from the sample in response to the second excitation light, and a second photodetector configured to detect the second fluorescence having passed through the second aperture; a scan mirror configured to scan the excitation light output from the first and second subunits on the sample and guide the fluorescence generated from the sample in response to the excitation light to the first and second subunits; a scan lens configured to guide the excitation light scanned by the scan mirror to the microscope optical system and guide the fluorescence focused by the microscope optical system to the scan mirror; and a main housing which is formed to be attachable to the connection port and to which the scan mirror, the scan lens, the first subunit, and the second subunit are fixed, wherein the first subunit includes a first beam splitter configured to reflect the first excitation light and the first fluorescence and transmit the second excitation light and the second fluorescence.

According to the above-described embodiment, the first excitation light output from the first subunit is reflected on the first beam splitter and is scanned on the sample via the scan mirror and the scan lens, the first fluorescence generated from the sample in response to the first excitation light is reflected on the first beam splitter via the scan lens and the scan mirror and is incident to the first subunit, and an image is formed on the first aperture in the first subunit and is detected by the first photodetector. In addition, the second excitation light output from the second subunit is transmitted through the first beam splitter in the first subunit and is scanned on the sample via the scan mirror and the scan lens, the second fluorescence generated from the sample in response to the second excitation light is transmitted through the first beam splitter via the scan lens and the scan mirror and is incident to the second subunit, and an image is formed on the second aperture in the second subunit and is detected by the second photodetector. Here, since the scan mirror, the scan lens, and the first and second subunits are fixed to the main housing, it is possible to set a positional relationship of the aperture and the optical system of the light source by the unit of the first and second subunits. As a result, it is possible to improve the accuracy of imaging in a plurality of wavelength regions while facilitating the setting work.

Alternatively, another embodiment of the present disclosure is a confocal microscope including the above-described confocal microscope unit and a microscope having the microscope optical system and the connection port to which the confocal microscope unit is attached. According to such a confocal microscope, it is possible to easily perform confocal imaging at desired excitation and fluorescence wavelengths.

Advantageous Effects of Invention

According to an aspect of the present disclosure, it is possible to easily set the aperture and the optical system of the light source and to improve the accuracy of imaging in a plurality of wavelength regions.

DESCRIPTION OF EMBODIMENTS

Figure 1:
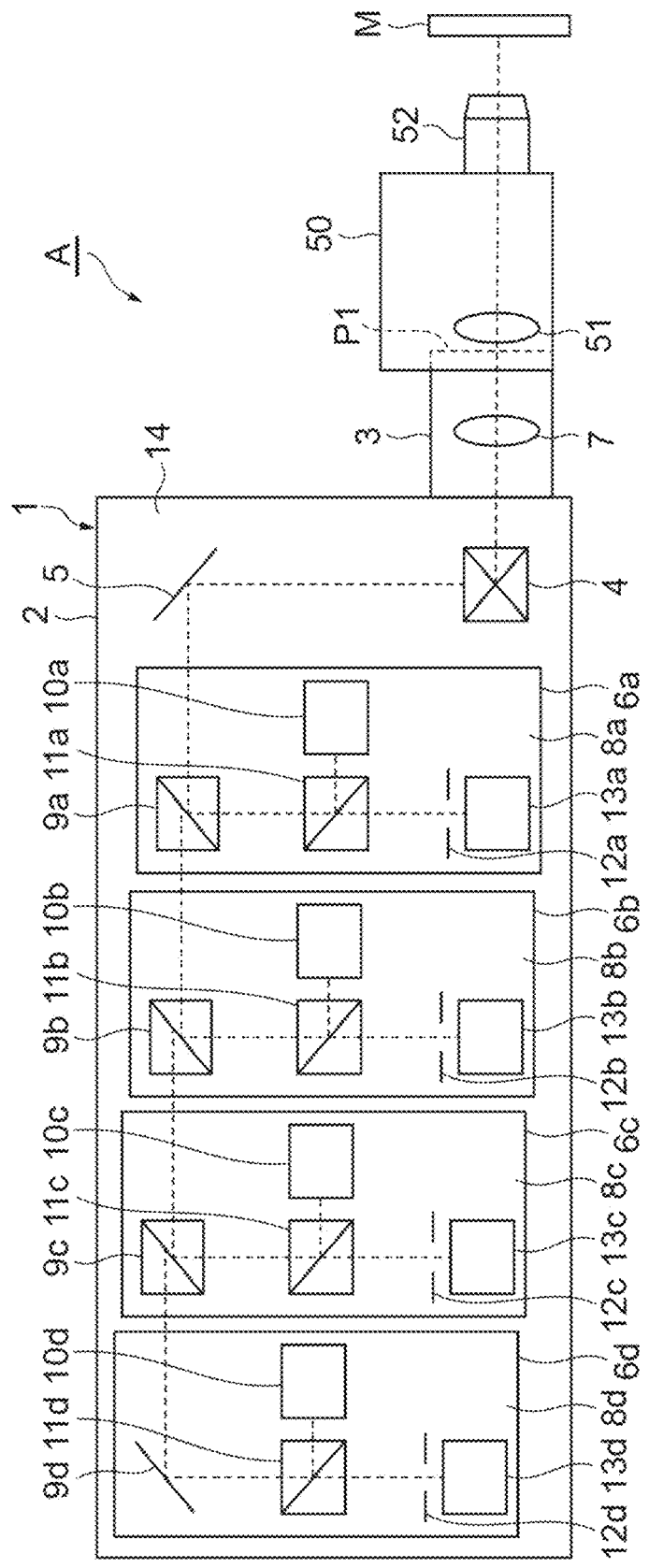
FIG. 1 is a schematic configuration diagram of a confocal microscope A according to an embodiment.

Hereinafter, an embodiment of the present disclosure will be described in detail with reference to the accompanying drawings. Additionally, in the description, the same reference numerals will be used for the same elements or elements having the same function and redundant description will be omitted.

FIG. 1 is a schematic configuration diagram of a confocal microscope A according to an embodiment. The confocal microscope A shown in FIG. 1 constitutes a confocal microscope that acquires an image enabling the construction of an optical sectioning image of a sample M to be observed and is configured such that a confocal microscope unit 1 is connected to a connection port P1 used for connection to an external unit of a microscope 50. This confocal microscope unit 1 is a device that irradiates the sample M disposed on a stage or the like of the microscope 50 via a microscope optical system such as an imaging lens 51 and an objective lens 52 inside the microscope 50 with excitation light, receives (detects) fluorescence generated from the sample M in response to the excitation light via the microscope optical system of the microscope 50, generates an optical sectioning image, and outputs the image.

Specifically, the confocal microscope unit 1 includes a main housing 2, a lens barrel 3 which constitutes a part of the main housing 2 and is removably connected to the connection port P1 of the microscope 50, a scan mirror 4, a fixed mirror 5, and first to fourth subunits 6a to 6d which are fixed into the main housing 2, and a scan lens 7 which is fixed into the lens barrel 3. Hereinafter, each component of the confocal microscope unit 1 will be described in detail.

The scan lens 7 in the lens barrel 3 is an optical element having a function of relaying a reflection surface of the scan mirror 4 to a pupil position of the objective lens 52 and forming a spot on a primary image plane of the microscope optical system of the microscope 50. The scan lens 7 irradiates the sample M by guiding the excitation light scanned by the scan mirror 4 to the microscope optical system and guides the fluorescence generated from the sample M in response to the excitation light to the scan mirror 4.

The scan mirror 4 in the main housing 2 is, for example, an optical scanning element such as a micro electro mechanical system (MEMS) mirror configured so that a reflector can be tilted in two axes. The scan mirror 4 has a function of scanning the excitation light output from the first to fourth subunits 6a to 6d on the sample M by continuously changing a reflection angle and guiding the fluorescence generated in response to the excitation light to the first to fourth subunits 6a to 6d.

The fixed mirror 5 is an optical reflecting element fixed into the main housing 2, reflects the excitation light output from the first to fourth subunits 6a to 6d to the scan mirror 4, and reflects the fluorescence reflected by the scan mirror 4 to the first to fourth subunits 6a to 6d coaxially with the excitation light.

The first subunit 6a includes a base plate 8a and a dichroic mirror (first beam splitter) 9a, a light source 10a, a dichroic mirror 11a, a pinhole plate (first aperture) 12a, and a photodetector (first photodetector) 13a which are disposed on the base plate 8a. The dichroic mirror 9a is a beam splitter which is fixed in the reflection direction of the fluorescence of the fixed mirror 5 and has a property of reflecting first excitation light of a wavelength $\lambda_1$ irradiated by the first subunit 6a and first fluorescence of a wavelength range $\Delta\lambda_1$ generated from the sample M in response to the first excitation light and transmitting light of a wavelength longer than those of the first excitation light and the first fluorescence. The dichroic mirror 11a is a beam splitter which is provided in the reflection direction of the first fluorescence of the dichroic mirror 9a and has a property of transmitting the first fluorescence of the wavelength range $\Delta\lambda_1$ and reflecting the first excitation light of the wavelength $\lambda_1$ shorter than that of the wavelength range $\Delta\lambda_1$. The light source 10a is a light emitting element (for example, laser diode) outputting the first excitation light (for example, laser beam) of the wavelength $\lambda_1$ and is disposed so that the first excitation light is reflected toward the dichroic mirror 9a coaxially with the first fluorescence by the dichroic mirror 11a. The pinhole plate 12a is an aperture which is disposed so that a pinhole position coincides with a conjugate position of a spot of the first excitation light of the sample M and limits the luminous flux of the first fluorescence and constitutes a confocal optical system along with the light source 10a and the like. This pinhole plate 12a has a pinhole diameter that can be adjusted from the outside and the resolution of the image detected by the photodetector 13a and the signal intensity of the image can be changed. The photodetector 13a is disposed so that a detection surface is opposed to the pinhole plate 12a and receives and detects the first fluorescence having passed through the pinhole plate 12a. Additionally, the photodetector 13a is a photomultiplier tube, a photodiode, an avalanche photodiode, a multi-pixel photon counter (MPPC), a hybrid photo detector (HPD), an area image sensor, or the like.

The second to fourth subunits 6b to 6d also have the same configuration as that of the first subunit 6a.

That is, the second subunit 6b includes a base plate 8b, a dichroic mirror (second beam splitter) 9b, a light source 10b, a dichroic mirror 11b, a pinhole plate (second aperture) 12b, and a photodetector (second photodetector) 13b. The dichroic mirror 9b has a property of reflecting second excitation light of a wavelength $\lambda_2$ ($>\lambda_1$) irradiated by the second subunit 6b and second fluorescence of a wavelength range $\Delta\lambda_2$ generated from the sample M in response to the second excitation light and transmitting light of a wavelength longer than those of the second excitation light and the second fluorescence. The dichroic mirror 11b has a property of transmitting the second fluorescence of the wavelength range $\Delta\lambda_2$ and reflecting the second excitation light of the wavelength $\lambda_2$ shorter than the wavelength range $\Delta\lambda_2$. The light source 10b is a light emitting element which outputs the second excitation light of the wavelength $\lambda_2$. The pinhole plate 12b is an aperture which is disposed so that a pinhole position coincides with a conjugate position of a spot of the second excitation light of the sample M and limits the luminous flux of the second fluorescence. The photodetector 13b is disposed so that a detection surface is opposed to the pinhole plate 12b and receives and detects the second fluorescence having passed through the pinhole plate 12b. Additionally, the photodetector 13b is a photomultiplier tube, a photodiode, an avalanche photodiode, a multi-pixel photon counter (MPPC), a hybrid photo detector (HPD), an area image sensor, or the like.

The third subunit 6c includes a base plate 8c, a dichroic mirror (third beam splitter) 9c, a light source 10c, a dichroic mirror 11c, a pinhole plate (third aperture) 12c, and a photodetector (third photodetector) 13c. The dichroic mirror 9c has a property of reflecting third excitation light of a wavelength $\lambda_3$ ($>\lambda_2$) irradiated by the third subunit 6c and third fluorescence of a wavelength range $\Delta\lambda_3$ generated from the sample M in response to the third excitation light and transmitting light of a wavelength longer than those of the third excitation light and the third fluorescence. The dichroic mirror 11c has a property of transmitting the third fluorescence of the wavelength range $\Delta\lambda_3$ and reflecting the third excitation light of the wavelength $\lambda_3$ shorter than the wavelength range $\Delta\lambda_3$. The light source 10c is a light emitting element which outputs the third excitation light of the wavelength $\lambda_3$. The pinhole plate 12c is an aperture which is disposed so that a pinhole position coincides with a conjugate position of a spot of the third excitation light of the sample M and limits the luminous flux of the third fluorescence. The photodetector 13c is disposed so that a detection surface is opposed to the pinhole plate 12c and receives and detects the third fluorescence having passed through the pinhole plate 12c. Additionally, the photodetector 13c is a photomultiplier tube, a photodiode, an avalanche photodiode, a multi-pixel photon counter (MPPC), a hybrid photo detector (HPD), an area image sensor, or the like.

The fourth subunit 6d includes a base plate 8d, a total reflection mirror 9d, a light source 10d, a dichroic mirror 11d, a pinhole plate (fourth aperture) 12d, and a photodetector (fourth photodetector) 13d. The total reflection mirror 9c reflects fourth excitation light of a wavelength $\lambda_4$ ($>\lambda_3$) irradiated by the fourth subunit 6d and fourth fluorescence of a wavelength range $\Delta\lambda_4$ generated from the sample M in response to the fourth excitation light. The dichroic mirror 11d has a property of transmitting the fourth fluorescence of the wavelength range $\Delta\lambda_4$ and reflecting the fourth excitation light of the wavelength $\lambda_4$ shorter than the wavelength range $\Delta\lambda_4$. The light source 10d is a light emitting element which outputs the fourth excitation light of the wavelength $\lambda_4$. The pinhole plate 12d is an aperture which is disposed so that a pinhole position coincides with a conjugate position of a spot of the fourth excitation light of the sample M and limits the luminous flux of the fourth fluorescence. The photodetector 13d is disposed so that a detection surface is opposed to the pinhole plate 12d and receives and detects the fourth fluorescence having passed through the pinhole plate 12d. Additionally, the photodetector 13d is a photomultiplier tube, a photodiode, an avalanche photodiode, a multi-pixel photon counter (MPPC), a hybrid photo detector (HPD), an area image sensor, or the like.

A positional relationship of the first to fourth subunits 6a to 6d with the above-described configuration will be described.

The first to fourth subunits 6a to 6d are fixed into the main housing 2 so that the first to fourth subunits are arranged in this order along the light guiding direction of the first to fourth fluorescences formed by the scan mirror 4 and the fixed mirror 5 to be away from the fixed mirror 5 and the dichroic mirrors 9a to 9c and the total reflection mirror 9d are located on the optical paths of the first to fourth fluorescences. Specifically, the second to fourth subunits 6b to 6d are respectively disposed to be shifted from the first to third subunits 6a to 6c by a predetermined distance d in a direction perpendicular to the light guiding direction of the second to fourth fluorescences based on the center positions of the dichroic mirrors 9a to 9c and the total reflection mirror 9d.

Figure 2:
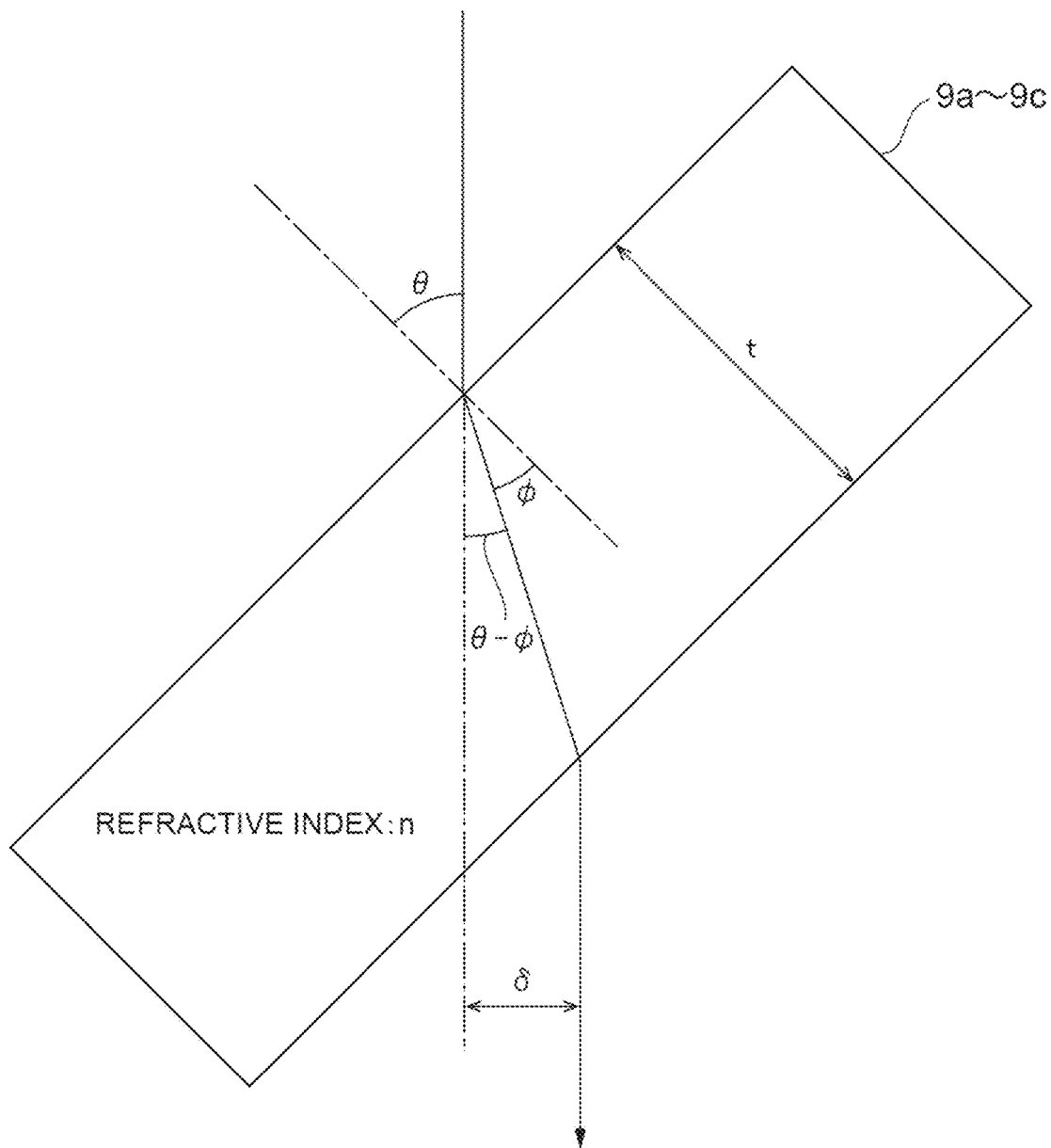
FIG. 2 is a plan view showing a refraction state of fluorescence in dichroic mirrors 9a to 9c.

This predetermined distance d is set to be substantially the same as a shift amount δ generated due to the refraction of the fluorescence of each of the dichroic mirrors 9a to 9c in a direction perpendicular to the optical path of the fluorescence transmitted in the dichroic mirrors 9a to 9c. In this embodiment, since the thickness of the mirror members constituting the dichroic mirrors 9a to 9c is set to be the same, the shift amount generated in the dichroic mirrors 9a to 9c is substantially the same and hence the shift distance d between two subunits adjacent to each other among the first to fourth subunits 6a to 6d is also set to be the same. This shift distance d is appropriately set in response to the refractive index and the thickness of the mirror member constituting the dichroic mirrors 9a to 9c. Specifically, if the mirror member has a thickness t and a refractive index n, an incident angle θ of the fluorescence incident to the mirror member, and a refraction angle ϕ in the mirror member, the shift amount δ of the fluorescence due to the mirror member is obtained as in FIG. 2. At this time, since the shift amount δ can be obtained as in the following formula (1), the shift distance (predetermined distance) d may be set in accordance with this shift amount δ. Additionally, the incident angle θ and the refraction angle ϕ have a relationship of the following formula (2).

$$\delta = t \cdot \sin(\theta - \phi)/\cos\phi \qquad (1)$$

$$\phi = \arcsin(\sin\theta/n) \qquad (2)$$

Additionally, when the incident angle θ is set to 45°, d=δ=0.33 t if the refractive index n of the mirror member is 1.5 and d=δ=0.29 t when the refractive index n of the mirror member is 1.4.

Figure 3:
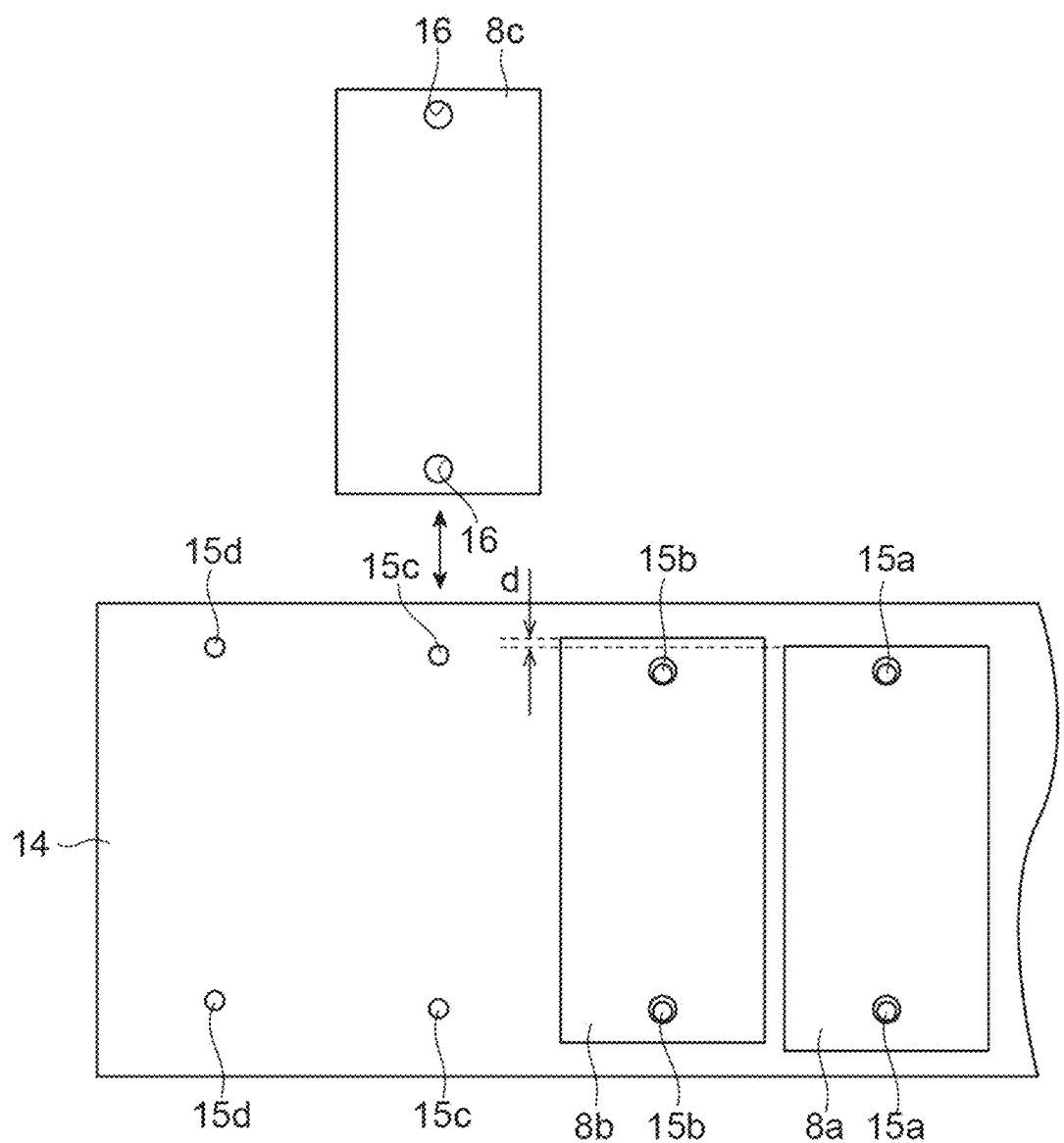
FIG. 3 is a plan view showing a positioning structure of first to fourth subunits 6a to 6d of a confocal microscope unit 1 of FIG. 1.

FIG. 3 shows an example of the positioning structure of the first to fourth subunits 6a to 6d. In FIG. 3, components of the first to third subunits 6a to 6d are not shown. In this way, two protrusion portions (first to fourth positioning portions) 15a to 15d are provided on the base plate 14 constituting the main housing 2 to respectively correspond to the first to fourth subunits 6a to 6d and hole portions 16 formed in the base plates 8a to 8d of the first to fourth subunits 6a to 6d are respectively fitted to two protrusion portions 15a to 15d so that the first to fourth subunits 6a to 6d are positioned to be shifted from each other by the predetermined distance d. Here, both of a gap of each of two protrusion portions 15a to 15d on the base plate 14 and a gap of each of two hole portions 16 of the base plates 8a to 8d are formed to be the same. In such a way, an arbitrary subunit can be selected from the first to fourth subunits 6a to 6d and can be disposed on the base plate 14 in the main housing 2. However, when a part of the subunits are selected from the first to fourth subunits 6a to 6d, the selected subunits are disposed to be packed on the side of the fixed mirror 5 and are arranged from the side of the fixed mirror 5 in order from the one having the shortest wavelength of the excitation light to be irradiated.

According to the above-described confocal microscope unit 1, the first excitation light output from the first subunit 6a is reflected on the dichroic mirror 9a and then is scanned on the sample M via the scan mirror 4 and the scan lens 7, the first fluorescence generated from the sample M in response to the first excitation light is reflected on the dichroic mirror 9a via the scan lens 7 and the scan mirror 4, and is incident to the first subunit 6a, and the image is formed on the pinhole plate 12a in the first subunit 6a and is detected by the photodetector 13a. In addition, the second excitation light output from the second subunit 6b is reflected on the dichroic mirror 9b in the second subunit 6b, is transmitted through the dichroic mirror 9a in the first subunit 6a, and is scanned on the sample M via the scan mirror 4 and the scan lens 7, the second fluorescence generated from the sample M in response to the second excitation light is transmitted through the dichroic mirror 9a via the scan lens 7 and the scan mirror 4, is reflected on the dichroic mirror 9b, and is incident to the second subunit 6b, and the image is formed on the pinhole plate 12b in the second subunit 6b and is detected by the photodetector 13b. Similarly, for the other second and third subunits 6c and 6d, the excitation light emitted from the own unit and the fluorescence generated in response to the excitation light are reflected on the dichroic mirror of the own unit and are transmitted through the dichroic mirror of the other unit. Accordingly, it is possible to independently detect the fluorescence generated in response to the excitation light of two wavelengths. Further, the first to fourth subunits 6a to 6d can be respectively adjusted so that the positions of the light source and the pinhole are in a conjugate relationship outside the confocal microscope unit 1 and the troublesome optical adjustment is not required after mounting to the confocal microscope unit 1. Accordingly, it is possible to easily add or replace the subunit.

Figure 4:
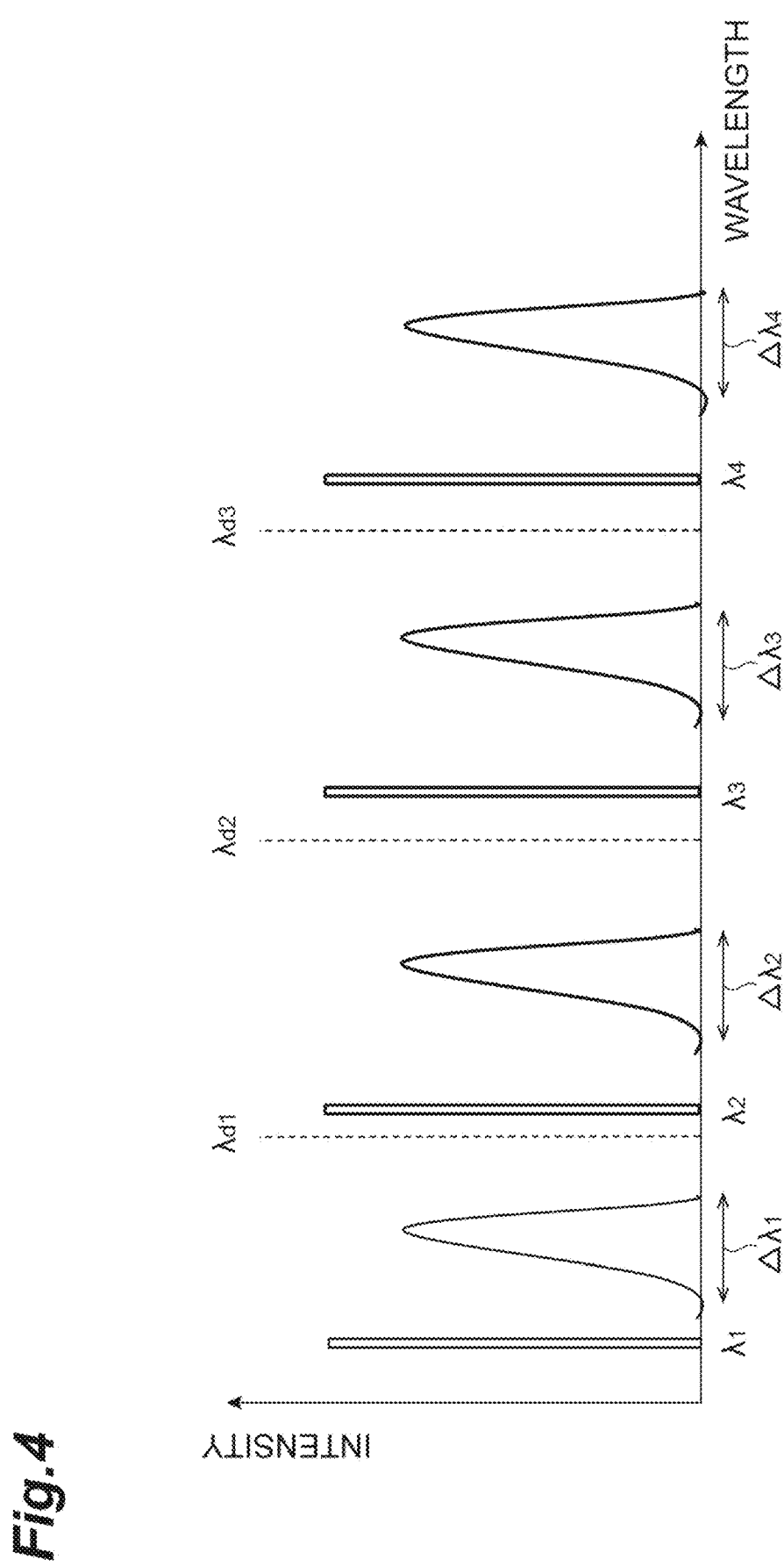
FIG. 4 is a graph showing wavelength distribution characteristics of excitation light and fluorescence handled by the first to fourth subunits 6a to 6d of FIG. 1.

FIG. 4 is a graph showing wavelength distribution characteristics of the excitation light and the fluorescence handled by the first to fourth subunits 6a to 6d. The wavelength range $\Delta\lambda_1$ of the fluorescence generated in response to the excitation light of the wavelength $\lambda_1$ irradiated from the first subunit 6a is generally in the vicinity of the wavelength $\lambda_1$ and in the range of the wavelength longer than the wavelength $\lambda_1$. On the contrary, the wavelength $\lambda_2$ of the excitation light irradiated from the second subunit 6b and the wavelength range $\Delta\lambda_2$ of the fluorescence generated in response to the excitation light are in the range of the wavelength longer than the wavelength $\lambda_1$ and the wavelength range $\Delta\lambda_1$. Here, the boundary wavelength $\lambda_{d1}$ of the optical division of the dichroic mirror 9a of the first subunit 6a is set to a value which is longer than the wavelength $\lambda_1$ and the wavelength range $\Delta\lambda_1$ and is shorter than the wavelength $\lambda_2$ and the wavelength range $\Delta\lambda_2$. Accordingly, it is possible to perform the confocal measurement in the range of the wavelength $\lambda_1$ and the wavelength range $\Delta\lambda_1$ using the first subunit 6a and to perform the confocal measurement in the range of the wavelength $\lambda_2$ and the wavelength range $\Delta\lambda_2$ using the second subunit 6b of the same device. Similarly, the boundary wavelength $\lambda_{d2}$ of the optical division of the dichroic mirror 9b of the second subunit 6b is set to a value which is longer than the wavelength $\lambda_2$ and the wavelength range $\Delta\lambda_2$ and is shorter than the wavelength $\lambda_3$ and the wavelength range $\Delta\lambda_3$ and the boundary wavelength $\lambda_{d3}$ of the optical division of the dichroic mirror 9c of the third subunit 6c is set to a value which is longer than the wavelength $\lambda_3$ and the wavelength range $\Delta\lambda_3$ and is shorter than the wavelength $\lambda_4$ and the wavelength range $\Delta\lambda_4$. Accordingly, it is possible to perform the confocal measurement in the range of the wavelength $\lambda_3$ and the wavelength range $\Delta\lambda_3$ using the third subunit 6c of the same device and to perform the confocal measurement in the range of the wavelength $\lambda_4$ and the wavelength range $\Delta\lambda_4$ using the fourth subunit 6d of the same device.

Here, the scan mirror 4, the scan lens 7, and the first to fourth subunits 6a to 6d are fixed to the main housing 2 and the first to fourth subunits 6a to 6d can be disposed on the base plate 14 of the main housing 2 so that an arbitrary subunit can be selected. With such a configuration, it is possible to set a positional relationship of the optical system of the light sources 10a to 10d, the pinhole plates 12a to 12d, and the photodetectors 13a to 13d by the unit of the first to fourth subunits 6a to 6d. As a result, it is possible to improve the accuracy of imaging in a plurality of wavelength regions while facilitating the setting work. That is, in the observation using the confocal microscope A, it is important to set the pinhole on the detector side and the light source at the conjugate position in order to maintain the measurement accuracy. According to this embodiment, it is possible to perform such setting by the unit of the subunit and to detect an image with high accuracy just by adjusting the scan mirror 4 and the scan lens 7 after accommodating the first to fourth subunits 6a to 6d in the main housing 2.

Further, since the pinhole diameters of the pinhole plates 12a to 12d of the respective first to fourth subunits 6a to 6d can be adjusted in response to the wavelength of the fluorescence to be observed, it is possible to adjust the resolution of the image and the signal intensity of the image in response to the wavelength of the fluorescence to be observed.

Further, in this embodiment, the thickness of the mirror members constituting the first to third dichroic mirrors 9a to 9c is set to be substantially the same. According to such a configuration, a shift between the optical axes of the excitation light or fluorescence generated by transmission through each of the first to third dichroic mirrors 9a to 9c can be set to be the same, a shift between the first to fourth subunits 6a to 6d may be set to the same distance d, and the positioning structure can be simplified. As a result, it is possible to realize imaging in a plurality of wavelength regions while facilitating the setting work of the first to fourth subunits 6a to 6b.

Specifically, the main housing 2 is provided with the protrusion portions 15a to 15d for positioning the first to fourth subunits 6a to 6d and these protrusion portions 15a to 15d are used for a positioning operation by shifting each of the second to fourth subunits 6b to 6d from each of the first to third subunits 6a to 6c by the predetermined distance d in a direction perpendicular to the light guiding direction of the fluorescence. If such a configuration is adopted, it is possible to position the subunit with respect to the other subunit at the front stage in accordance with the shift of the optical axis of the excitation light or fluorescence generated by transmission through the dichroic mirror in the other subunit at the front stage. As a result, it is possible to improve the accuracy of imaging in four wavelength regions.

Additionally, the shift distance d of each of the second to fourth subunits 6b to 6d with respect to the first to third subunits 6a to 6c at the front stage may be set in response to the shift amount $\delta$ of the optical path of the fluorescence due to the dichroic mirrors 9a to 9c. Further, since the shift amount is different in accordance with the wavelength of the fluorescence, the shift distance d for the subunit at the front stage may be set to a different value for each subunit. However, when the shift amount $\delta$ of the optical path of the fluorescence due to the dichroic mirrors 9a to 9c is not almost changed, the shift distance d of each subunit for the subunit at the front stage may be set to the same value.

In the above-described embodiment, the scan mirror 4 is configured as the MEMS mirror. In the case of such a configuration, the miniaturization of the device can be easily realized.

Although various embodiments of the present disclosure have been described above, the present disclosure is not limited to the above-described embodiment and may be modified without departing from the spirit of each claim or may be applied to other embodiments.

In the above-described embodiment, the pinhole plate is used as an aperture to form a confocal optical system, but may be, for example, an iris diaphragm, a fiber core, or the like if the aperture is any optical element that limits the luminous flux. When a fiber output type light source is used, the position of the end surface of the fiber core may be the aperture position (the position where the luminous flux is limited).

Further, in the above-described embodiment, a laser light source such as a solid-state laser or a diode laser can also be used. In this case, the position of the beam waist of these laser light sources may be set to the aperture position (the position where the luminous flux is limited) and the light source itself plays the role of the aperture.

In the above-described embodiment, the first to fourth subunits 6a to 6d are arranged in order from the one having the shortest wavelength range of the excitation light and the fluorescence to be handled to be away from the side of the scan mirror 4, but may be arranged in order from the one having the longest wavelength range. However, in this case, the characteristics of the dichroic mirrors 9a to 9c are set to the characteristics in which the excitation light and the fluorescence having a relatively long wavelength handled by each of the subunits 6a to 6c are reflected and the excitation light and the fluorescence having a relatively short wavelength handled by the other subunits are transmitted.

In the above-described embodiment, the main housing may include the first positioning portion which positions the first subunit and the second positioning portion which positions the second subunit and the first positioning portion and the second positioning portion may position the second subunit by shifting the second subunit from the first subunit by a predetermined distance in a direction intersecting the light guiding direction of the fluorescence. Accordingly, the horizontal positions of the beams from the respective subunits can be aligned.

Further, this predetermined distance may be set in accordance with the shift amount of the optical path of the fluorescence in a direction intersecting the light guiding direction of the fluorescence. In this case, the second subunit can be positioned to the first subunit in accordance with the shift of the optical axis of the excitation light or fluorescence generated by transmission through the first beam splitter. As a result, it is possible to improve the accuracy of imaging in a plurality of wavelength regions.

In the above-described embodiment, the scan mirror may be a MEMS mirror. In this case, the miniaturization of the device can be easily realized.

Further, the first subunit and the second subunit may be fixed to the main housing while being arranged in order of the first subunit and the second subunit along the light guiding direction of the fluorescence formed by the scan mirror. According to such a configuration, the first and second excitation light irradiated from the first and second subunits can be irradiated to the sample on the side of the microscope via the first beam splitter in the first subunit and the first and second fluorescence generated from the sample in response to the first and second excitation light can be introduced into the first and second subunits via the first beam splitter in the first subunit. As a result, it is possible to realize imaging in a plurality of wavelength regions with the same device.

Furthermore, the confocal microscope unit may further include the third subunit which includes the light source configured to output the third excitation light, the third aperture configured to limit a luminous flux of the third fluorescence generated from the sample in response to the third excitation light, and the third photodetector configured to detect the third fluorescence having passed through the third aperture and the second subunit may include the second beam splitter configured to which reflect the second excitation light and the second fluorescence and transmit the third excitation light and the third fluorescence. According to such a configuration, the second excitation light output from the second subunit is reflected on the second beam splitter in the second subunit, is transmitted through the first beam splitter in the first subunit, and is scanned on the sample via the scan mirror and the scan lens, the second fluorescence generated from the sample in response to the second excitation light is transmitted through the first beam splitter via the scan lens and the scan mirror, is reflected on the second beam splitter, and is incident to the second subunit, and an image is formed on the second aperture in the second subunit and is detected by the second photodetector. In addition, the third excitation light output from the third subunit is transmitted through the second beam splitter in the second subunit and the first beam splitter in the first subunit, and is scanned on the sample via the scan mirror and the scan lens, the third fluorescence generated from the sample in response to the third excitation light is transmitted through the first beam splitter and the second beam splitter via the scan lens and the scan mirror and is incident to the third subunit, and an image is formed on the third aperture in the third subunit and is detected by the third photodetector. Accordingly, it is possible to realize imaging in three wavelength regions with the same device.

Further, the main housing may include the second positioning portion which positions the second subunit and the third positioning portion which positions the third subunit and the second positioning portion and the third positioning portion may position the third subunit to the second subunit by shifting the third subunit from the second subunit by a predetermined distance in a direction intersecting the light guiding direction of the fluorescence. If such a configuration is adopted, the third subunit can be positioned to the second subunit in accordance with the shift of the optical axis of the excitation light or fluorescence generated by transmission through the second beam splitter. As a result, it is possible to improve the accuracy of imaging in a plurality of wavelength regions.

Further, the thickness of the first beam splitter may be the same as the thickness of the second beam splitter. If such a configuration is adopted, the shift of the optical axis of the excitation light or fluorescence generated by transmission through each of the first and second beam splitters can be the same and the setting of the arrangement between the first to third subunits can be facilitated. As a result, it is possible to realize imaging in a plurality of wavelength regions while facilitating the setting work.

Furthermore, the first subunit, the second subunit, and the third subunit may be fixed to the main housing while being arranged in order of the first subunit, the second subunit, and the third subunit along the light guiding direction of the fluorescence formed by the scan mirror. In this case, the first to third excitation light irradiated from the first to third subunits can be irradiated to the sample on the side of the microscope via the first and second beam splitters in the first and second subunits and the first to third fluorescence generated from the sample in response to the first to third excitation light can be introduced into the first to third subunits via the first and second beam splitters in the first and second subunits. As a result, it is possible to realize imaging in three wavelength regions with the same device.

INDUSTRIAL APPLICABILITY

In the embodiment, since a unit in which the light source outputting the excitation light and the aperture limiting the luminous flux of the fluorescence are provided at the conjugate position with respect to the dichroic mirror is used for the confocal microscope unit constituting the confocal microscope and the confocal microscope, it is possible to easily perform confocal imaging at a plurality of wavelengths.

REFERENCE SIGNS LIST

M: sample, P1: connection port, d: predetermined distance, 10a to 10d: light sources, 12a to 12d: pinhole plates (apertures), 13a to 13d: photodetectors, 15a to 15d: protrusion portions (positioning portions), 6a to 6b: first to fourth subunits, 9a to 9c: dichroic mirrors (first to third beam splitters), 1: confocal microscope unit, 2: main housing, 3: lens barrel, 4: scan mirror, 7: scan lens, 50: microscope, A: confocal microscope.

The invention claimed is:

1. A confocal microscope unit attached to a connection port of a microscope including a microscope optical system to constitute a confocal microscope, the confocal microscope unit comprising:
    a first subunit including a light source configured to output first excitation light, a first aperture configured to limit a luminous flux of first fluorescence generated from a sample to be observed in response to the first excitation light, and a first photodetector configured to detect the first fluorescence having passed through the first aperture;
    a second subunit including a light source configured to output second excitation light, a second aperture configured to limit a luminous flux of second fluorescence generated from the sample in response to the second excitation light, and a second photodetector configured to detect the second fluorescence having passed through the second aperture;
    a scan mirror configured to scan the excitation light output from the first and second subunits on the sample and guide the fluorescence generated from the sample in response to the excitation light to the first and second subunits;
    a scan lens configured to guide the excitation light scanned by the scan mirror to the microscope optical system and to guide the fluorescence focused by the microscope optical system to the scan mirror; and
    a main housing which is formed to be attachable to the connection port and to which the scan mirror, the scan lens, the first subunit, and the second subunit are fixed,
    wherein the first subunit includes a first beam splitter configured to reflect the first excitation light and the first fluorescence and transmit the second excitation light and the second fluorescence,
    wherein the main housing includes a first positioning portion positioning the first subunit and a second positioning portion positioning the second subunit,
    wherein the first positioning portion and the second positioning portion position the second subunit by shifting the second subunit from the first subunit by a predetermined distance in a direction intersecting a light guiding direction of the fluorescence,
    wherein the predetermined distance is set in response to a shift amount of an optical path of the fluorescence in a direction intersecting the light guiding direction of the fluorescence, and
    wherein the predetermined distance is set in response to a refractive index and a thickness of the first beam splitter.

2. The confocal microscope unit according to claim 1, wherein the scan mirror is a MEMS mirror.

3. The confocal microscope unit according to claim 1, wherein the first subunit and the second subunit are fixed to the main housing while being arranged in order of the first subunit and the second subunit along a light guiding direction of the fluorescence guided by the scan mirror.

4. The confocal microscope unit according to claim 1, further comprising:
    a third subunit including a light source configured to output third excitation light, a third aperture configured to limit a luminous flux of third fluorescence generated from the sample in response to the third excitation light, and a third photodetector configured to detect the third fluorescence having passed through the third aperture,
    wherein the second subunit includes a second beam splitter configured to reflect the second excitation light and the second fluorescence and transmit the third excitation light and the third fluorescence.

5. The confocal microscope unit according to claim 4, wherein the main housing includes a third positioning portion positioning the third subunit, and
    wherein the second positioning portion and the third positioning portion position the third subunit by shifting the third subunit from the second subunit by a predetermined distance in a direction intersecting a light guiding direction of the fluorescence.

6. The confocal microscope unit according to claim 4, wherein a thickness of the first beam splitter is the same as a thickness of the second beam splitter.

7. The confocal microscope unit according to claim 4, wherein the first subunit, the second subunit, and the third subunit are fixed to the main housing while being arranged in order of the first subunit, the second subunit, and the third subunit along a light guiding direction of the fluorescence guided by the scan mirror.

8. A confocal microscope comprising:
    the confocal microscope unit according to claim 1; and
    a microscope having the microscope optical system and the connection port to which the confocal microscope unit is attached.

* * * * *